Figure 1:
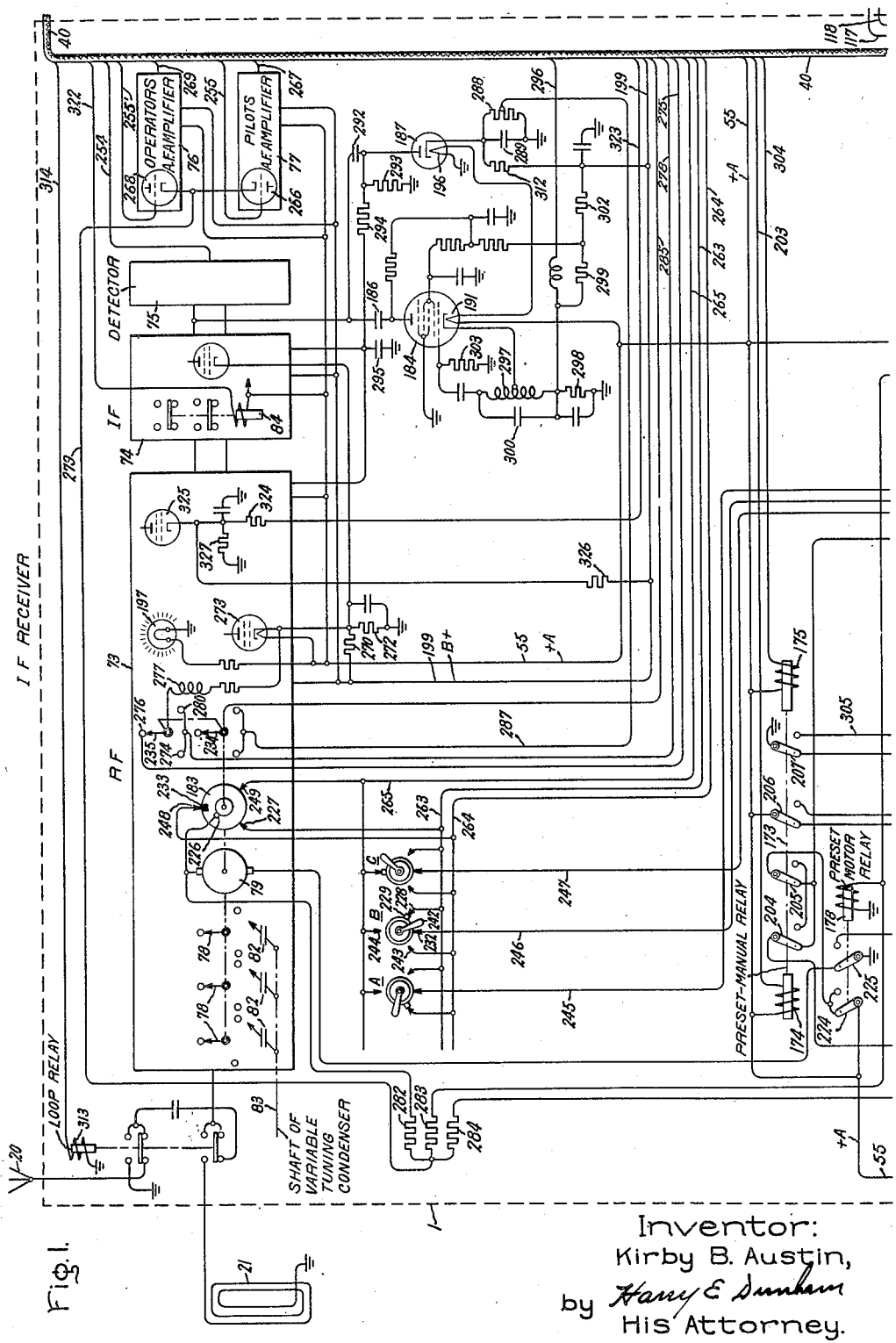

Inventor:
Kirby B. Austin,
by Harry E. Dunham
His Attorney.

Jan. 31, 1950     K. B. AUSTIN     2,495,916
REMOTE CONTROL RECEIVER
Filed Oct. 7, 1944     6 Sheets-Sheet 4

Inventor:
Kirby B. Austin,
by Harry E. Dunham
His Attorney.

Jan. 31, 1950 K. B. AUSTIN 2,495,916
REMOTE CONTROL RECEIVER
Filed Oct. 7, 1944 6 Sheets-Sheet 5

Inventor:
Kirby B. Austin,
by Harry E. Dunham
His Attorney.

Jan. 31, 1950     K. B. AUSTIN     2,495,916
REMOTE CONTROL RECEIVER

Filed Oct. 7, 1944     6 Sheets-Sheet 6

Inventor:
Kirby B. Austin,
by Harry E. Dunham
His Attorney.

Patented Jan. 31, 1950

2,495,916

UNITED STATES PATENT OFFICE 2,495,916

REMOTE CONTROL RECEIVER

Kirby B. Austin, Bridgeport, Conn., assignor to General Electric Company, a corporation of New York Application October 7, 1944, Serial No. 557,670

12 Claims. (Cl. 250—20)

1

My invention relates to receivers adapted for remote control and to control means therefor.

It has for one of its objects to provide improved remote control means for such reecivers whereby they may be controlled from one or more remote points with increased facility and reliability.

Another object is to provide means whereby the receiver may be controlled in all of its operations at each remote point, while each remote point is provided with means to seize control of the receiver at any time, and irrespective of whether or not the receiver is being operated at the time from another remote point. In this way an operator at any remote point, requiring the use of the receiver, may seize control of it irrespective of any use that any other operator may be making of it.

Another object of my invention is to provide improved and reliable indicating means at the different remote points to indicate whether the receiver is energized and what remote point, or station, has control of it.

A further object of my invention is to provide means for selecting, at one or more remote stations, any one of a plurality of frequencies predetermined in the receiver, with a minimum of operations and a minimum of attention on the part of the operator. In accord with my invention such selection is effected by a single operation on the part of the operator consisting in moving a knob, or dial, to a position corresponding to the frequency to be selected in which position it may be released and the selection of the corresponding frequency automatically and reliably follows.

Another object of my invention is to provide reliable indication of the frequency selected at the remote point at which such operation is effected.

A further object of the invention is to secure these results at any of a plurality of stations, notwithstanding that only one remote station is connected to control the frequency selecting means at the receiver at any one time, and the control of the receiver is alternatively switched from one station to another.

Another object of my invention relates to improved means for tuning the receiver to predetermined frequencies from such remote points and to prevent tuning of the receiver to undesired frequencies. It sometimes happens in the remote control of such receivers that an operation is effected at a remote point to initiate a cycle of operations at the receiver to tune the receiver to a desired frequency, when during the cycle, and before its completion, an operation is effected at the remote point calling for tuning of the receiver to a different frequency. This operation may be affected by change in the control means at one station during the cycle of operations at the receiver, or it may be caused by a second station seizing control of the receiver during the incompleted cycle of operations, the second station being adjusted to call for the second frequency. An object of my invention is to provide means at the receiver to assure tuning to the selected frequency irrespective of the operations at the remote station or their occurrence in the cycle of operations at the receiver.

An object of my invention is to provide means to complete any cycle of operations at the receiver that is once called for from the remote station having control of the receiver irrespective of any operation that may occur at the remote station before the cycle is completed and irrespective of any change in control of the receiver from one remote station to another. A further object is to provide means operative to tune the receiver to a second frequency only after the previously initiated cycle of operations is completed. In this way any tuning cycle once initiated is completed before any second tuning cycle can be initiated. This assures against tuning to any false frequencies not called for by operations at any remote station having control of the receiver.

Further objects of my invention will be understood from the following detailed description of my invention.

Figure 5:
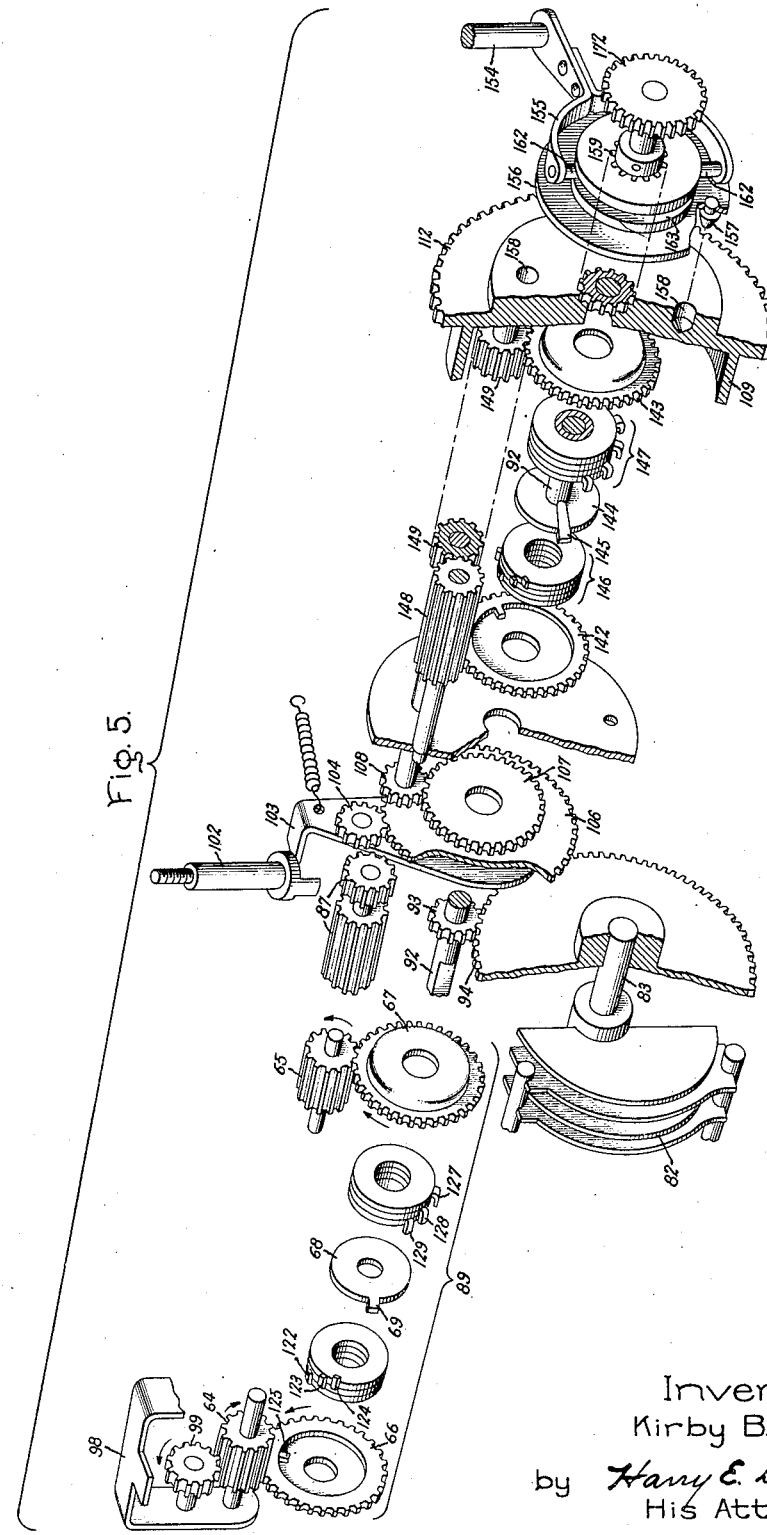
Figure 6:
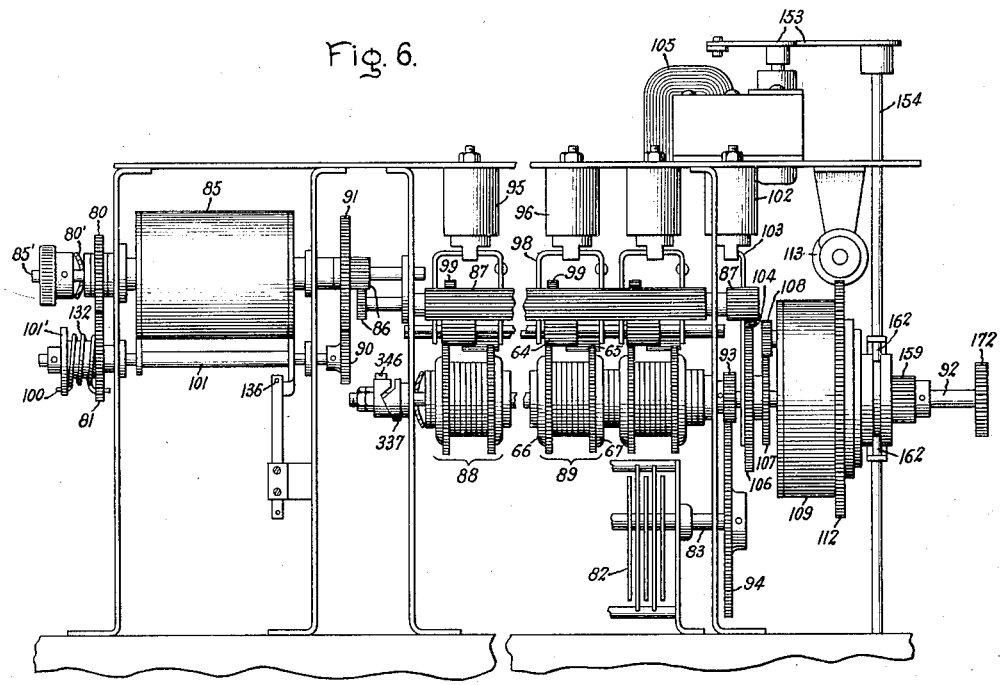
Figure 7:
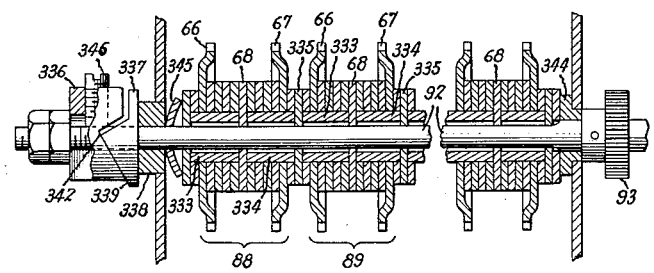

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawing in which Figs. 1, 2, 3 and 4 taken together, Figs. 1, 2 and 3 being positioned side by side from left to right in that order and Fig. 4 being positioned below Fig. 1, represent an embodiment of my invention; Fig. 5 represents an exploded view of a part of the tuning mechanism shown in Fig. 4; Fig. 6 represents an elevation view of this tuning mechanism; and Fig. 7 represents a detail thereof.

Figure 4:
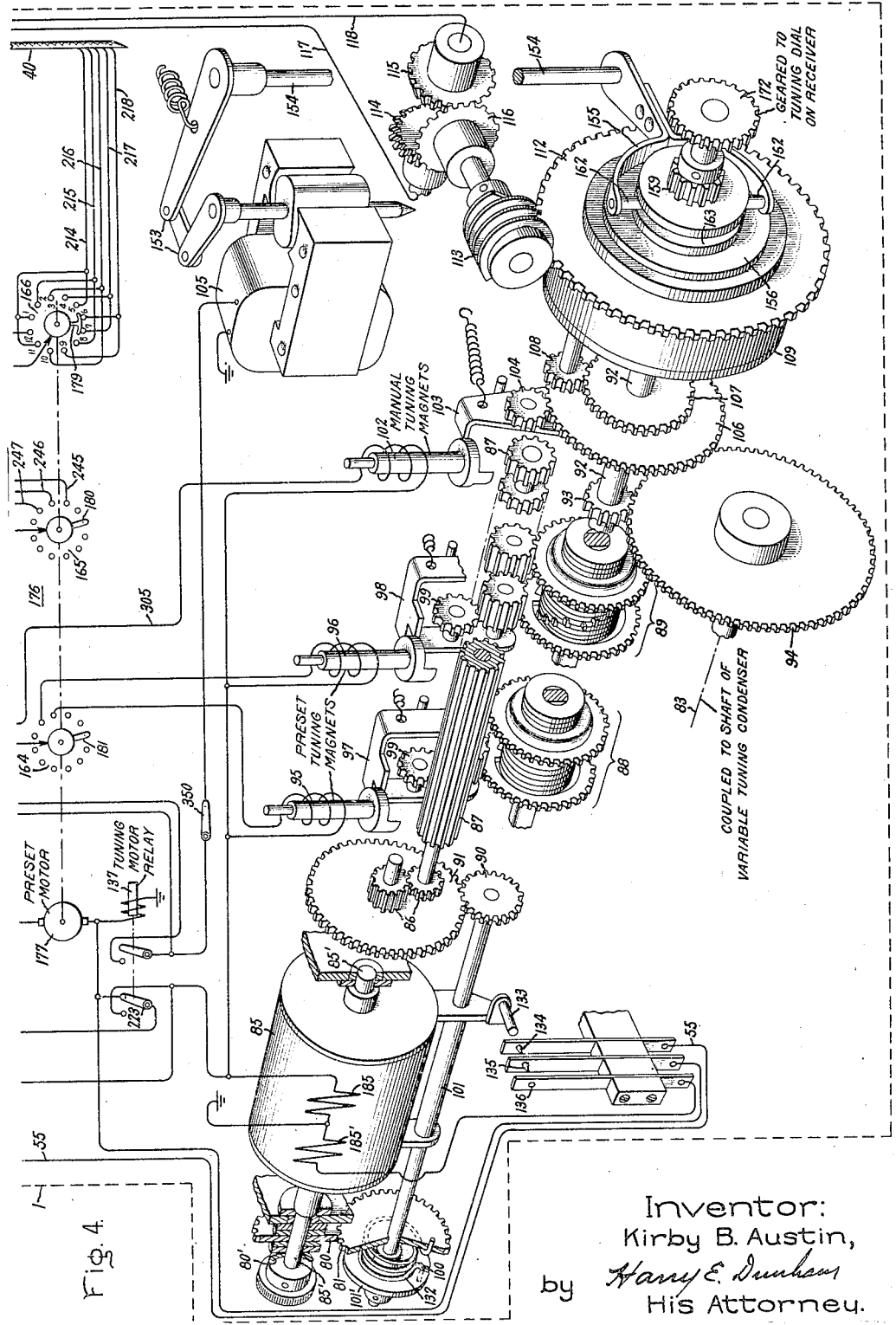

In Figs. 1 and 4 I have represented by the dotted rectangle 1 a radio receiver which may be considered to be one which operates over a band of frequencies extending, for example, from 190–2000 kilocycles. I shall designate frequencies in this range as intermediate frequencies, or by the characters I. F. If desired this range of frequencies may be covered in three separate bands by the use of band change means later to be indicated.

Figure 2:
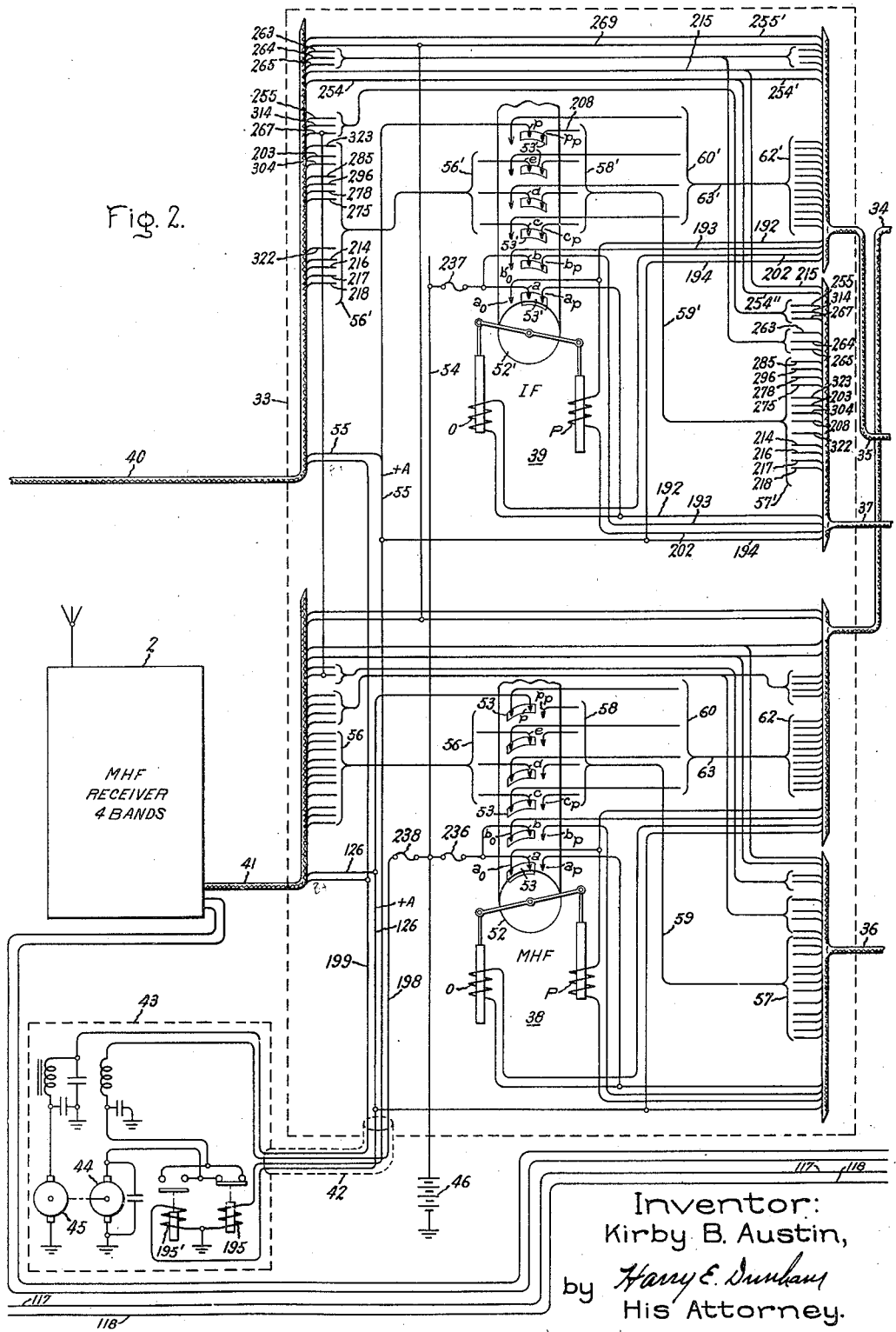

In Fig. 2 I have represented by rectangle 2 a second similar receiver adapted for higher frequencies, which I designate as medium high frequencies (M. H. F.), as for example frequencies extending from 2000–18,100 kilocycles, this range being covered in four bands by a band switch mechanism.

These two receivers may be carried upon an aircraft and are arranged for reception of various types including, for example, reception in the various bands as desired, and including both continuous wave telegraphic reception and continuous wave voice reception. They are adapted to be tuned automatically to any one of a number of predetermined frequencies, which may be selected by the operator by operation of a suitable switch device. These frequencies may be in any of the bands covered by the respective receivers. The receivers are also arranged to be manually tuned to any frequency throughout any of the ranges. These various types of operation may all be effected by remote control from stations positioned elsewhere in the craft remote from the receivers.

Figure 3:
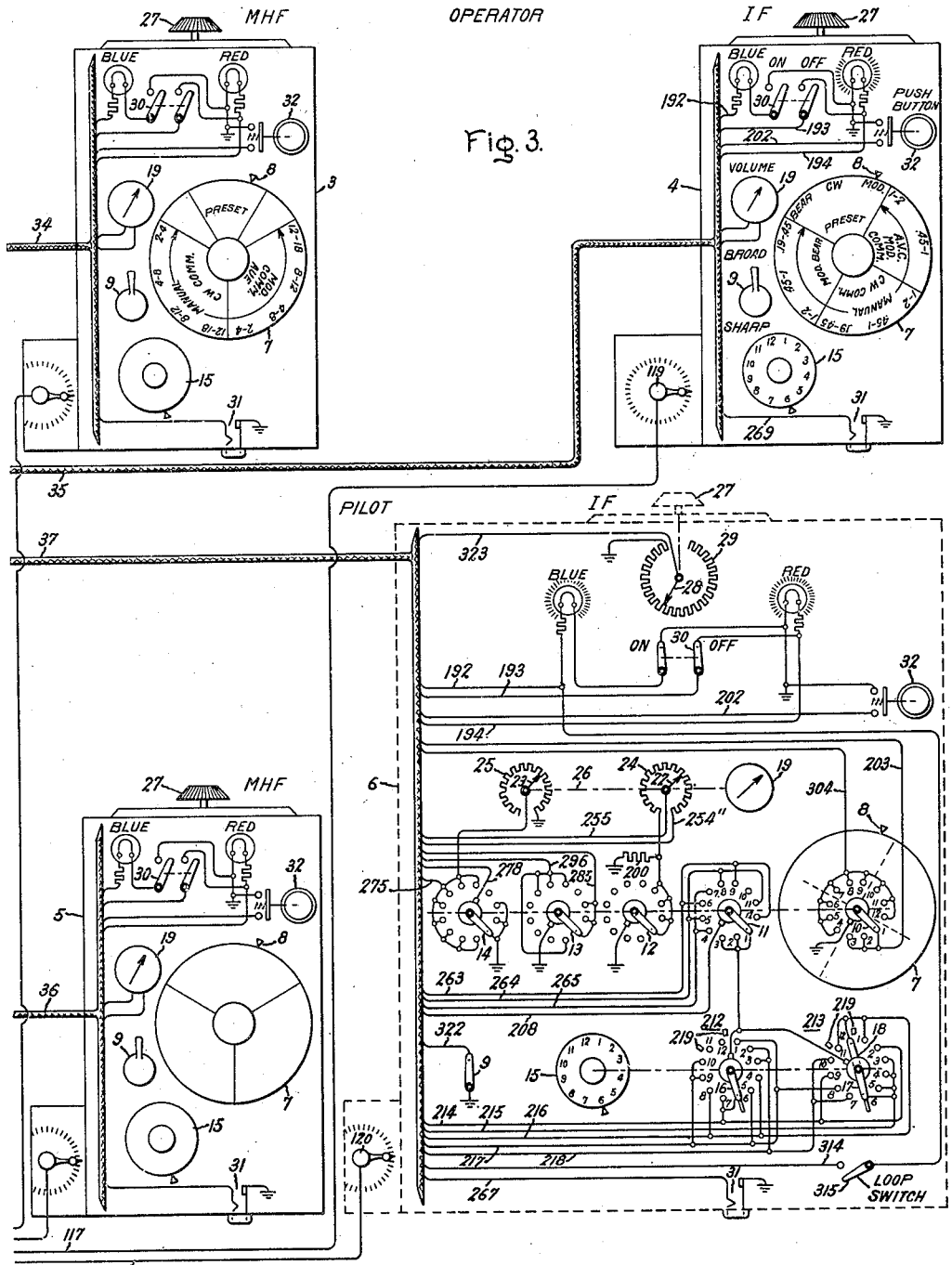

These remote control stations may, for example, comprise an operator's station designated by the legend Operator in Fig. 3 and a pilot's station designated by the legend Pilot in Fig. 3. Each of these stations comprises two control boxes 3 and 4 at the operator's station, and 5 and 6 at the pilot's station. The control box 3 at the operator's station, and control box 5 at the pilot's station, each bears the legend M. H. F. since it is arranged to control the medium high frequency receiver 2 when connected thereto through a relay 38 shown in Fig. 2. This relay bears the characters M. H. F. since it controls the connections of the M. H. F. control boxes 3 and 5 to the M. H. F. receiver. This relay is a two-position multiple contact relay arranged in one position to connect the operator's M. H. F. control box 3 to the receiver and in the other position to connect the pilot's M. H. F. control box 5 to the receiver. It is operated to its different positions by respective operating coils O and P controlled by push buttons 32 in the respective operator's and pilot's control boxes 3 and 5.

The control box 4 at the operator's station and the control box 6 at the pilot's station bear the legend I. F. since they control the intermediate frequency receiver 1. These control boxes are arranged to be connected alternatively to control receiver 1 by a two-position multiple contact relay 39 shown in Fig. 2, this relay being similar to relay 38 and arranged for operation to its two positions by push buttons 32 in the I. F. control boxes at the operator's and pilot's control stations.

These control boxes 3, 4, 5 and 6 are all essentially the same in their circuit structure and accordingly the complete circuits of only one is shown, namely, that of control box 6. Each control box has a rotatable dial indicated at 7, which may be rotated to various positions corresponding to the different types of reception provided. This dial has properly positioned thereon, as shown in the control box 4, indications of the different types of reception provided, and its periphery cooperates with an index 8 by which is designated the particular reception corresponding to the respective position of the dial. For example, with the dial 7 in the operator's I. F. control box positioned as shown, the I. F. receiver is adapted for modulated reception with preset tuning.

This control dial is marked in four quadrants which bear the respective legends Preset; Mod. bear.; C. W. comm.; and Mod comm., referring respectively to preset tuning; modulated bearing reception, which is modulated reception without automatic volume control and which may be by a loop antenna for determination of bearing, although the vertical antenna may be employed; continuous wave telegraphic communication, which is telegraphic reception without automatic volume control and with the use of a local beat oscillator; and modulated communication, which is audio or voice modulated reception with automatic volume control.

The three sectors, other than the "preset" sector, are marked "Manual" meaning that when the dial is adjusted to these positions the receiver is tunable manually by operation of hand cranks 119 or 120 associated with the respective control boxes 4 and 6.

The outer periphery of the three manual-tuning sectors of the control dial are marked with characters indicating the frequency band in which reception is had when the dial is adjusted to the respective positions.

The outer periphery of the "preset" sector of dial 7 is marked with three legends, "Mod.," "C. W." and "Bear.," referring respectively to voice reception, telegraphic reception and bearing reception. The latter reception may be with a rotatable loop antenna shown at the left side of Fig. 1 of the drawing.

This dial 7 is arranged to rotate a number of contact arms 10, 11, 12, 13 and 14, shown in the control box 6, which are effective to control the receiver to bring about reception of the type indicated in the corresponding position on the control dial 7. Each of these arms is rotatable with the dial over a respective bank of contacts arranged in a circle. The circuit connections effected by these arms in their different positions will later be indicated in detail.

Each control box also has a further dial 15, operable to ten different positions in accord with predetermined stations, or frequencies, to be received. This dial is provided with three contact arms 16, 17 and 18 (shown in box 5 of Fig. 3) which operate, through means later to be described, to cause the receiver to be tuned to the desired preselected frequencies, or stations.

Each box also has a volume control knob 19, which has a pair of contact members 22 and 23, which operate over respective volume control resistors or potentiometers 24 and 25. These contact arms 22 and 23 are mechanically connected for unicontrol, as indicated by the dotted line 26.

Each control box also has a control knob 27 which carries a contact arm 28 operating over a resistance 29 to effect fine tuning of the receiver in a manner later to be indicated. Each control box also has a switch 9 to control the reception frequency band width of the respective receiver and a jack 31 in which headphones may be plugged for reception of signals.

Control box 6 has a switch, which bears the legend Loop switch, which when operated energizes a relay designated Loop relay as shown in the upper left-hand corner of Fig. 1 to disconnect the vertical antenna 20 from the receiver and connect thereto the loop antenna 21 shown in Fig. 1.

Each control box is also provided with a blue light designated on the drawing by the legend Blue and a red light designated by the legend Red, the blue light when energized being arranged to indicate the particular control box which has control of the receiver, and the red light when energized indicating that the particular receiver is energized for operation.

The two-pole On-Off switch 30 provided in each control box is connected to energize and deenergize, in accord with the position thereof, the respective receiver when the control box has control of the receiver. Each control box is so connected and arranged that the operator at any control station may at any time seize control of the respective receiver, irrespective of what reception the operator at the other station may be having at the particular instant, simply by operating his own push button 32. Of course if his On-Off switch is in the "off" position, then the operator taking control of the receiver must energize the receiver by operating his own On-Off switch to the "on" position. Push button 32 is operative at all times irrespective of the position of the On-Off switch 30.

These control boxes are connected to their respective receivers through a junction box represented by the dotted rectangle 33 in Fig. 2 to which the different control boxes 3, 4, 5 and 6 are connected by respective multiconductor cables 34, 35, 36 and 37. This junction box 33 includes the two two-position multicontact relays 38 and 39 previously referred to. It is connected to the two receivers through respective multiconductor cables 40 and 41 and it is connected through a further cable 42 to a dynamotor unit 43 comprising a motor 44 and a generator 45, the first of which is arranged to be energized from a source of operating potential 46 carried by the craft and when energized drives the generator to supply anode operating potential to the discharge devices in the different receivers.

The relays 38 and 39 each comprises a drum 52, or 52', carrying along its length a group of conducting segments 53, or 53', arranged in parallel spaced relation, each about a portion of the circumference of the drum. These segments are continuously engaged by respective contacts $a$, $b$, $c$, etc., each of which is continuously connected either to the respective receiver or to equipment common to the two receivers. Thus, as shown, contacts $a$ and $b$ are connected through conductor 54 to the power source 46. Contacts $c$, $d$, $e$, and others, as indicated by the brackets 56 and 56' are connected through conductors in the respective cables 40 and 41 to the respective receiver. Contacts $p$ of relays 39 and 38 are connected respectively through conductors 55, or 126, to the dynamotor unit 43. These segments when in one position engage a further contact $a_p$, $b_p$, $c_p$, etc. connected to conductors extending to the pilot's control box, and when in the other position they engage respective contacts $a_o$, $b_o$, $c_o$, etc. connected to conductors extending to the operator's control box.

When these relays are in the position in which relay 39 is illustrated these contacts $a$ to $p$ are connected through the respective contact segments 53 to conductors extending to the respective pilot's control box. To avoid complication of the drawing, a number of these connections are represented by brackets 57 and 58 joined by a single line 59. When the relays are in the position in which relay 38 is shown, such connections are made to the respective operator's control box. A number of these connections are represented by the brackets 60 and 62 joined by a single line 63.

The lower two segments 53, which are engaged by contacts $a$ and $b$, respectively, are included in circuits by which the relay is operated by its operating coils O and P in response to operation of push buttons 32 in the control boxes. These circuits also control the blue and red lights on the control boxes and the energization of the receiver. These circuits will later be traced in detail.

The receivers, as has been indicated, are substantially alike in their circuit structure. The details of one of the receivers, namely, the I. F. receiver, insofar as they are pertinent to my present invention, are represented in Figs. 1 and 4. This may comprise a superheterodyne receiver having a radio frequency portion 73, an intermediate frequency portion 74, a detector 75, and separate audio amplifiers 76 and 77 for the operator and pilot, respectively.

The radio frequency portion 73 may include a three-position band switch 78 operated by a hand switch motor 79 to select the frequency band in which operation is desired. This portion also includes the usual uncontrolled tuning condensers 82 operated by a shaft 83, which is driven by tuning mechanism shown in Fig. 4.

The intermediate frequency portion 74 of the superheterodyne receiver includes a relay 84, which may be characterized as the broad-sharp relay since it may be utilized to control the band width of the intermediate frequency channel of the receiver.

The receiver also comprises a beat frequency oscillator 184, which is arranged to be controlled from the different control stations over conductor 296 and when operative supplies oscillations through condenser 186 to the detector to beat with the intermediate frequency oscillations to produce an audible beat note which may be heard in the head phones, as in telegraphic reception.

It also comprises a diode rectifier 187, which is utilized for automatic volume control purposes under certain conditions of reception as will later be indicated.

The tuning mechanism, shown in Fig. 4, comprises a motor 85 having a shaft 85', which is connected through suitable reduction gearing 80, 81, 90, 91 and 86 to a long gear 87 which extends throughout the length of the tuning mechanism and which is operated whenever the tuning motor is energized. This shaft operates through a number of different gear groups 88, 89, etc., each corresponding to a frequency to be selected, to drive a shaft 92, which is geared through gears 93 and 94 to the shaft 83 of the tuning condenser. Each gear group 88, 89, of which there may be ten, for example, is associated with an electromagnet 95, 96, each corresponding to a frequency to be selected and each of which, when energized, attracts an armature 97, 98 carrying a respective gear 99, into mesh with the gear 87, whereby the latter gear operates through the respective gear 99 to actuate the respective gear group 88, 89 to drive the shaft 83 to select the desired frequency. The frequency is selected when the gears in the respective group jam, as will later be fully explained.

When it is desired to tune the receiver manually, the manual tuning electromagnet 102 is energized and also momentarily, for a purpose later to be indicated, clutch electromagnet 105.

The manual tuning magnet attracts its armature 103, which carries a gear 104 into mesh with the long gear 87, whereby it is driven and, through gears 105 and 107, drives gear 108 the latter of which operates through a group of gears within clutch housing 109, similar to the groups of gears 88 and 89 to drive the shaft 92 and consequently gears 93, 94 and the tuning condenser shaft 83 to a position where the gears within clutch housing 109 jam. The time or position in their operation when these gears jam is determined by the position in rotation of gear 112 which forms a part of the housing 109. This latter gear 112 is arranged to be manually rotated about shaft 92 in accord with the frequency to be selected by means of a worm gear 113, which may be driven through bevel gears 114 and 115 both of which cooperate with the bevel gear 116 on the worm gear shaft and both of which are connected through mechanical connections 117 and 118 with respective hand cranks 119 and 120 near, or mounted upon, the respective control boxes 4 and 6.

The operation of this mechanical tuning assembly may better be seen from the exploded view of Fig. 5 in which the gear group 89 is illustrated and in which the gears within the gear housing 109 are shown in detail. This Fig. 5 illustrates the armature 98 carrying the gear 99 into mesh with the gear 87, which extends throughout the length of the equipment and which is driven by the tuning motor. For clearness of the drawing only the right end of the gear 87 is shown thereby to avoid concealing the gears 64 and 65 of group 89, which lie back of gear 87.

Gear 99 is continuously in mesh with gear 64 and the latter is continuously in mesh with the gear 65, these latter two gears being arranged to rotate in opposite directions. Gear 64 meshes with gear 66, which rotates loosely about the shaft 92 in the direction indicated by the arrow thereon, and gear 65 meshes with gear 67, which similarly rotates about shaft 92 in the opposite direction.

Between these two gears 66 and 67 is arranged the disk 68, which is securely, but adjustably, attached to the shaft 92 carrying the gear 93 which drives the gear 94 and the shaft 83 of the tuning condenser 82. This disk 68 has a projection 69 from its periphery and is positioned circumferentially in accord with the frequency to be selected by gear group 89. Between this disk 68 and the gear 66 are a number of washers, each having a projection from its periphery, these projections being indicated at 122, 123 and 124. There may be any number of these washers but the first washer carrying the projection 122 may be positioned within the gear 66. This gear 66 has an inward projection 125. The washers carrying the projections 122, 123 and 124 are loose on the shaft 92 and the projection 122 is arranged to be engaged by the projection 125 and to be rotated thereby in the same direction as the gear 66. When it is rotated sufficiently, the projection 122, which extends over the periphery of the next adjacent washer, engages the projection 123 and then the two washers are rotated until the projection 123 engages the projection 124 when the three washers are rotated. This continues until the projection 124 finally engages the projection 69 thereby causing the disk 68 and hence the shaft 92 to be rotated. During this time gear 67 rotates in the opposite direction and causes a similar pile-up of washers having corresponding projections 127, 128 and 129 which rotate in the opposite direction until finally the last projection 129 engages the opposite side of the projection 69. When this happens the gears jam, rotation of shaft 92 stops leaving the condenser in its desired position corresponding to the adjustment of disk 68 about the shaft, and motor 85 stalls.

The stator of motor 85, as shown in Fig. 4, is so arranged that when the motor stalls it rotates clockwise against the tension of a spring 132 causing an arm 133 carried thereby to operate three contacts 134, 135 and 136 into engagement. When this occurs, the tuning motor relay 137, shown just above motor 85, becomes energized and opens the energizing circuit of the tuning motor and the magnet 96. The receiver is thus tuned to the predetermined frequency selected by the energization of "preset" magnet 96.

At the right-hand portion of Fig. 5 is shown the group of gears within the housing 109, this group of gears comprising the gears 142 and 143 corresponding to gears 66 and 67 of group 89, and between which is located the disk 144, which is secured to the shaft 92 and which has a projection 145 from its periphery as did washer 68 of the gear group 89. Between this disk 144 and gear 142 is the group of washers 146, and similarly between this disk 144 and gear 143 is a group of washers 147. These groups 146 and 147 of washers operate between gears 142 and 143 in exactly the same way as do washer groups 122, 123, 124 and 127, 128, 129 between gears 66 and 67 to drive the shaft 92 through disk 144, attached thereto, to the desired position where the gears jam as was described in connection with gear group 89.

In this case, however, the position in rotation of shaft 92 at which the gears jam is not determined by any adjustment of washer 144 about shaft 92, as is the case in connection with washer 68, but by the position in rotation of gear 112 and the housing 109, the disk 144 being permanently fixed on the shaft. It will be seen that this housing 109 carries the gears 148 and 149, which mesh with each other and which mesh respectively with gears 142 and 143 all after the manner of gears 64 and 65 of group 89. By rotation of housing 109 the position of these gears 148 and 149 is rotated about shaft 92 and about the periphery of gears 142 and 143. Of course during this rotation, gear 108, by which these gears are driven from gear 107, rotates about the periphery of gear 107. In this way the frequency selected by this group of gears 142, 143, 148, 149 is determined by the position in rotation of gear 112, just as that selected by group 89 is determined by the position in rotation of disk 68 on the shaft 92. Of course, as previously explained, the position in rotation of gear 112 is controlled by worm 113 (Fig. 4), which is operated by hand cranks 119 and 120 through bevel gears 114, 115 and 116.

It will now be seen that the group of gears in housing 109 provides in effect one additional preset frequency, in addition to those provided by gear groups 88, 89, etc., and that this additional preset frequency is variable by the hand cranks at the control stations which rotate housing 109. During preset tuning the clutch magnet 105 (Fig. 4) is energized to decouple shaft 92 from this housing 109 to permit free rotation of the shaft 92. This magnet operates through mechanical linkage 153, shaft 154, and clutch operating member 155 to operate clutch member 156 to the right, as shown in Fig. 5, thereby with-drawing pins 157 carried thereby from holes 158 in gear 112 thereby permitting shaft 92 and clutch member 156 to rotate freely while gear 112 and housing 109 remain fixed in position since gear 112 is in mesh with worm 113.

Clutch operating member 155 is bifurcated and carries two inwardly projecting pins 162, which ride in a groove 163 in clutch member 156 thereby to operate the clutch member longitudinally on a splined portion 159 of shaft 92 while permitting its free rotation with the shaft.

When changing from preset tuning to manual tuning, the clutch magnet is energized only long enough to permit the motor 85 to operate shaft 83 to a position corresponding to the position in rotation of housing 109 and gear 112, i. e. to a position agreeing with the position of the hand cranks. This assures agreement between the frequency calibration of the hand cranks and the actual position of the tuning condenser. Then the clutch magnet is automatically deenergized, and pins 157 enter holes 158 locking the shaft 92 to the housing 109. The tuning condenser can then be rotated by the hand crank for manual tuning of the set to desired frequencies which may be accurately indicated by a calibration on a dial geared to the hand cranks.

Shaft 92 is provided with a gear 172 which may also be employed to operate any suitable indicating device on the receiver to indicate the frequency to which the receiver is tuned.

The system for controlling the tuning mechanism includes, in addition to the tuning motor relay 137, previously mentioned, a two-position relay 173 designated Preset-manual relay, which is operated to the left by coil 174 for preset tuning and to the right by coil 175 for manual tuning. It also includes a "preset" selector switch 176, which rotates to any one of ten positions in accord with the adjustment of the preset frequency selector dial 15 at the respective control box thereby to select the appropriate magnet 95, 96, etc., corresponding to the desired preset frequency. This switch comprises three rotating contact arms 179, 180 and 181 operated over respective banks of contacts by motor 177, which is controlled by "preset" motor relay 178.

Different contacts in the bank cooperating with contact arm 179 are selectively energized in accord with the position of the "preset" selector dial 15 at the control station. If contact arm 179 engages an energized contact, voltage is supplied to relay 178 which operates, through circuits later to be described, to energize tuning motor 85. This tuning motor then operates to complete any uncompleted tuning operation after which motor 177 becomes energized. Motor 177 drives the selector switch 176 to a position where contact arm 179, which is broad enough to engage simultaneously two adjacent contacts, engages two adjacent contacts both of which are deenergized. Relay 178 then drops out, the motor 177 stops, and the switch 176 is left with its contact arms in position corresponding to the desired preset frequency.

In this position, arm 181 selects the magnet 95, 96, etc., corresponding to the desired preset frequency. Arm 180 selects the frequency band in which the selected frequency lies and operates through switches A, B, C, etc., and the commutator 183 to control band switch motor 79 to operate band selector switch 78 to the position corresponding to the desired frequency band.

A better understanding of the system may now best be had by more detailed consideration of its operation.

*Energizing circuits and pilot lamps*

It will be seen that with the apparatus in the position shown, the red and blue lights in the pilot's I. F. control box 6 are indicated as energized and that the On-Off switch 30 in that control box is closed. The blue light indicates that this control box has control of the I. F. receiver and the red light indicates that that receiver is energized. The blue light of the operator's I. F. control box is deenergized but the red light is lighted indicating to the operator that the receiver is energized.

The circuit of the blue light of the pilot's I. F. control box extends from the battery 46 over conductor 54, contacts $a$ and $a_p$ of the I. F. relay 39 in the junction box 33, conductor 192, which extends through cable 37 to the pilot's I. F. control box where it extends through the blue lamp and left-hand contact arm of switch 30 to ground thereby energizing the blue lamp.

The energization of the receiver is brought about by means of a circuit which extends from the battery 46 through the contacts $b$ and $b_p$ of the I. F. relay, conductor 193, which extends through the same cable 37 and thence through the right-hand arm of switch 30, conductor 194, which extends back through the cable 37 to the junction box and thence through conductor 55, which extends through cable 42 to relay 195 in the dynamotor unit, and through cable 40 to the I. F. receiver to supply the A operating voltage thereto. The red lamp of the pilot's I. F. control box 6 is connected between conductor 194 and ground and is thus energized. Conductor 194 also extends from the junction box through cable 35 to the red lamp in the operator's I. F. control box. That lamp is, therefore, also energized indicating to the operator that the receiver is energized.

In the receiver 1, the conductor 55, which is labeled +A, supplies A voltages, or cathode energizing voltages, to all of the discharge devices in the radio receiver including the two discharge devices 184 and 187, the heaters 191 and 196 of which are connected in series between conductor 55 and ground. This conductor also extends through lamp 197 to ground, which lamp is energized to indicate that the receiver is in operation and to provide illumination of its dial. Conductor 55 is also connected to contact 134 of the tuning motor stator assembly thereby to bring about the operation of the tuning motor relay 137 when the tuning motor stalls as above described.

Relay 195 of the dynamotor unit, is energized through the above described circuit and closes a circuit for the motor 44 through its contacts and conductor 198 extending to battery 46. Motor 44 thus operates and drives generator 45, which develops anode operating potential between conductor 199 and ground. This conductor 199 extends through cable 42 and thence through both cables 40 and 41 to the two receivers 1 and 2. In the receiver 1 the conductor 199, which is designated B+, extends to the R. F., I. F. and A. F. portions of the receiver to supply anode operating potential to the anodes of the discharge devices employed therein. It also supplies operating potential to the beat oscillator 184 and bias potential to the cathode of diode 187 to render that device non-conductive.

While this B potential is supplied also to receiver 2. A potential is not now supplied thereto and that receiver is therefore inoperative.

All of these circuits are controlled by the pilot's On-Off switch, which completes the circuits of the red and blue lights, the filament and dial lamp circuits in the receiver, the automatic tuning mechanism, and also that of relay 195 in the dynamotor unit. Relay 195, in turn, energizes the motor 44 thereby energizing the receiver.

The pilot may now by operation of the controls on his control box control the receiver 1 to effect the reception he desires. The operator has no control of the receiver since his box 4 is disconnected therefrom by relay 39. He may seize control of it, however, at any time by simple operation of his push button 32. This push button closes a circuit which extends from ground through the contacts of push button 32, conductor 202 in box 4, which extends through cable 35, coil O of relay 39 and its contacts $a_p$ and $a$ to conductor 54 and battery 46. Coil O operates I. F. relay 39 to its opposite position thereby disconnecting box 6 from the receiver and connecting box 4 to control the receiver. At the same time the circuit from coil O to the operator's push button is opened to prevent damage to the coil should he continue to press the button for any reason. The operator thus acquires control of the receiver and the pilot loses control until he operates his push button 32 to again seize control. The operator now, to maintain the receiver energized, must close his On-Off switch since the energizing circuit of the receiver now extends from battery 46 through conductor 54, contacts $b$ and $b_o$ of the relay, conductor 193 of cable 35 and thence through the right-hand contact arm of the operator's On-Off switch, and conductor 194 back to conductor 55 and relay 195 in the dynamotor unit.

Both red lights, of course, are lighted but the blue light of the pilot's box is now extinguished since its circuit is broken at contacts $a$ and $a_p$ of relay 39. The blue light at the operator's box is lighted since its circuit is completed at contacts $a$ and $a_o$ of relay 39.

In this way either the operator or the pilot may seize control of the receiver at any time irrespective of what operation the other may be having and the signal lights indicate correctly the condition of the apparatus.

Of course, this same operation is had from the M. H. F. control boxes 3 and 5 through similar circuits, which are now obvious from the drawing, the only difference being that relay 195', rather than 195, in the dynamotor unit is operated to energize motor 44. Conductor 126 of cable 41 carries operating potential to receiver 2, just as did conductor 55 of cable 40 carry operating potential to receiver 1. These conductors are connected respectively to the high voltage terminals of the windings of relays 195' and 195 so that if either receiver is turned on by operating switch 30 on whichever control box has control, the dynamotor operates to supply anode operating potential. Further either the operator or the pilot may operate and receive signals from both receivers at the same time by operation of both buttons 32 and the On-Off switches 30 in the control boxes of his respective station. This is of advantage in that either of the receivers may be energized or deenergized from either station without aid from the other station. For example, let us suppose that the operator about to leave the craft, for example, observes that one of his red lights is lighted while his On-Off switch for that receiver is in the "off" position. This would of course mean that that receiver is energized through the pilot's box and that that box has control of the respective receiver. He may know that the pilot has already left the craft. He may, however, deenergize the receiver, without going to the pilot's station, by pushing his push button 32 to seize control of the receiver. Since his On-Off switch is already in the "off" position, the receiver is deenergized and all lights are extinguished.

The provision of separate relays 195 and 195' in the dynamotor unit makes possible the reliable control of the motor from all the different control boxes with a minimum of equivalent and without undesired sneak circuits causing faulty operation of the equipment. At the same time this arrangement provides circuits which may be adequately fuse protected by fuses 236, 237 and 238 at the junction box.

*Predetermined frequency selection*

Assuming that the apparatus is in the position shown and that the pilot desires to receive modulated signals, as for example voice, from a station which the receiver is adapted to select by preset tuning, he operates the dial 7 to the position shown in the drawing whereupon the contact arms 10, 11, 12, 13 and 14 occupy the position illustrated. Arm 10 connects to ground a conductor 203, which extends through the cable 37 to the junction box, thence through contacts $c$ and $c_p$ on the I. F. relay 39 and conductor 203 of cable 40 to the I. F. receiver, and thence through the coil 174 of the preset-manual relay to the +A conductor 55. Coil 174 thus operates the several armatures 204 to 207 to the left, as shown in the drawing, to adapt the receiver for automatic tuning to a predetermined frequency corresponding to the position to which the preset frequency dial 15 at the pilot's control box may be operated.

Armature 206 of preset-manual relay 173 completes an energizing circuit for clutch magnet 105 which operates to withdraw pins 157 from holes 158 (Fig. 5) in the clutch housing thereby to permit shaft 92 of the tuning mechanism to rotate freely while the clutch housing 109 remains stationary since it meshes with manual tuning drive worm 113.

Arm 11, operated by the control dial 7, connects all of the rotary contact arms 16, 17 and 18, operated by the preset frequency dial 15, through conductor 208, which extends through the cable 37, and contacts $p$ and $p_p$ on the I. F. relay, to the +A bus 55. These contacts 16, 17 and 18 thus have impressed on them the potential of battery 46. Contact arms 16 and 17 operate over contacts 1 to 10 of respective banks of contacts 212 and 213, each of which includes twelve contacts. They are prevented from engaging contacts 11 and 12 of these banks by stops 219. Contact arm 18 operates over the bank 213 and is positioned diametrically opposite contact arm 17.

The different contacts of these banks 212 and 213 are connected through five conductors 214, 215, 216, 217 and 218, which extend through cable 37, to the junction box where four of the five conductors may be traced through corresponding contacts on the I. F. relay, the fifth conductor 215 being common to the corresponding conductor from switch 15 in box 4 in cable 35 and not requiring switching by the I. F. relay. The five conductors then extend through cable 40 to contacts in the circular bank 166 of a motor driven "preset" selector switch 176 with which cooperates the rotary contact arm 179. As previously stated, this contact arm 179 is operated in unison with the other contact arms of the switch 176 and is connected to ground through the winding of relay 178. This contact arm 179 is sufficiently wide to contact any two adjacent contacts in the bank 166 and the contacts of this bank are so wired through the conductors 214 to 218 to the contacts of the banks 212 and 213 at the control box that two adjacent contacts in the bank 166 are deenergized for each position of the contact arms 16, 17 and 18 of the preset frequency switch 15. Other contacts may be deenergized, but in no case are more than two adjacent contacts deenergized and the two adjacent contacts which are deenergized are positioned about the bank in accord with the position of the arms 16, 17 and 18, and hence in accord with the frequency to be selected.

For example, with switches 16, 17 and 18 in the position shown, voltage is supplied from the conductor 208 through contact arm 11 and the contact arm 16 to conductor 214, through arm 17 to conductor 215, and through arm 18 to conductor 216. No voltage is supplied to conductors 217 and 218. When conductors 214, 215 and 216 have voltage impressed thereon, voltage exists on contacts 1, 2, 3, 5, 8, 10, 11 and 12 of bank 166 of switch 176, the last contact 12 being connected directly to the +A bus. Contacts 6 and 7 are the only two adjacent contacts which do not have voltage applied thereto. Contact arm 179 is shown in engagement with these two contacts and hence relay 178, which is connected thereto, is shown in its deenergized position.

Let us suppose that the pilot now desires to select preset frequency No. 3. He operates the dial 15 to the position where contact arms 16, 17 engage contact 3 in their respective banks and contact arm 18 engages contact 9 in bank 213. Then voltage is supplied through contact arm 16 to conductor 218, through arm 17 to conductor 215, and through arm 18 to conductor 214. These conductors apply voltage to contacts 1, 2, 5, 6, 8, 9 and 11 of bank 166 leaving adjacent contacts 3 and 4 deenergized. Relay 178 is thus immediately energized and operates its contacts to the right. In operating its left-hand armature 224 to the right, this relay momentarily breaks a holding circuit for tuning motor relay 137, which drops out breaking the circuit for "preset" motor 177 at armature 223. Thus the "preset" motor does not immediately operate.

This holding circuit for relay 137 extends from the +A bus 55 through the left-hand armature 224 of relay 178 in its left-hand position, armatures 205 and 204 of the preset-manual relay, and armature 223 of the tuning motor relay in its right-hand position and thence through the winding of the tuning motor relay 137 to ground. The tuning motor relay therefore is deenergized and operates its armatures to its left-hand position where its contact 223 completes a circuit for the forward winding 185 of the tuning motor 85. This circuit is the same as that previously described extending from the +A bus 55 through the left-hand armature of relay 178, armatures 205 and 204 of the preset-manual relay, armature 223 of the tuning motor relay in its left-hand position and thence through the forward winding 185 of the tuning motor 85. The tuning motor then operates until one of its gear groups jams, as previously described, if its gears are not already jammed, when the motor stalls and its stator tends to rotate against the spring 132 thereby operating arm 133 into engagement with contact 134 and causing the contacts 134, 135 and 136 all to engage. Voltage is then supplied from the +A bus 55 through contacts 134 and 135 to the tuning motor relay, causing it to energize and break the circuit of the tuning motor at its armature 223 in its left-hand position and to close again the above traced holding circuit for itself by this armature 223 in its right-hand position.

The "preset" motor is now connected directly across relay 137 through right-hand armature 225 of relay 178 in its right-hand position and this motor 177 is thus energized and rotates "preset" selector switch 176 until contact arm 179 engages the two adjacent deenergized contacts 3 and 4 of its respective bank. Relay 178 is then deenergized and drops out. Its left-hand armature again momentarily interrupts the holding circuit of tuning motor relay 137 and that relay drops out again energizing the tuning motor. This time, however, contact arm 181 of switch 176 is in engagement with contact 3 of its respective bank 164 thereby energizing "preset" tuning magnet 95 through a circuit which extends from ground at the right-hand armature 207 of the preset-manual relay, through contact arm 181 on its third contact, winding of "preset" tuning magnet 95, left-hand armature 223 of the tuning motor relay, armatures 204 and 205 of the preset-manual relay, and left-hand armature 224 of the "preset" motor relay 178 to the +A bus. Tuning motor 85 now operates and drives the tuning mechanism until the gears of group 88 jam. This occurs when the tuning condenser shaft 83 has been operated to the preset position corresponding to the frequency to be selected. The motor then stalls and the stator again operates contacts 134, 135 and 136 to energize the tuning motor relay 137, which operates to interrupt the forward circuit of the motor. Thus the rotor of the tuning condenser 82 is adjusted to receive the desired frequency.

When relay 178 is deenergized, due to contact arm 179 engaging its contacts 3 and 4, it, by its right-hand armature, closes a circuit for the band switch motor 79, which extends from ground at armature 225 of relay 178, through motor 79, brush 226 on commutator 183, contact 227 in engagement with this commutator, contacts 228, 229 and 232 of preset band selector B, conductor 246, third contact of bank 165 of the "preset" selector switch, rotary contact arm 180, armature 205 of the preset-manual relay, and armature 224 of the "preset" relay 178 to the +A bus 55. Motor 79 now operates, after motor 177 has completed its operation, and drives the band switch 78 and the commutator 183 until the nonconducting segment 233 engages contact 227. The motor circuit is then broken and the band switch is positioned at the desired band.

Preset band selectors A, B, C, etc., of which there may be as many as there are frequencies to be selected by preset tuning, are drums each of which has a contact 229 permanently connected, as by a slip ring and brush connection, to one of the conductors 245, 246, 247 leading to a respective contact of the bank 165 and which may be operated by a handle 242 to engage any one of the stationary contacts 228, 243 and 244. These contacts 228, 243 and 244 are connected to respective brushes 227, 248, 249 of commutator 183 on the shaft of the band selector switch thereby to deenergize the band switch motor 79 when it operates the nonconducting segment 233 under the respective contact, thereby to stop the band switch in a position corresponding to the band in which the frequency to be selected lies.

The brushes 227, 248 and 249 are also connected through respective conductors 263, 264 and 265, which extend through cable 40 to junction box 33 and thence through cable 37 to control box 6 and cable 35 to box 4 where they are connected to different respective contacts of the bank engaged by arm 11 of switch 7 in other positions. In this way the arm 11 selects the band in which reception is had when the receiver is tuned manually.

On the shaft of the band switch are two additional contact arms 234 and 235 which establish certain circuit conditions desired in the different bands. These circuit connections will later be described in connection with the more complete description of circuits established by arms 10 to 14 of the pilot's control dial 7.

It will now be observed that any deenergization of relay 137 energizes the tuning motor. This is true irrespective of the position of the preset-manual relay since the holding circuit for relay 137 extends through armatures 204 and 205 of this relay in either of its two positions. Any operation of this relay interrupts this holding circuit and energizes the tuning motor to complete any previously uncompleted tuning operation.

Moreover, any operation of relay 178 causes its left-hand armature to break momentarily the holding circuit of tuning motor relay 137 thereby to energize the tuning motor and to cause that motor to operate to complete any previously uncompleted tuning operation. Thus, for example, let us suppose that the pilot moves his preset frequency dial 15 to any other one of its ten positions. Relay 178 is immediately energized breaking momentarily the operating circuit of relay 137, which operates to energize the tuning motor, which immediately operates to a position where its gears jam, if they are not already jammed. Thereafter the tuning motor relay 137 is again energized and the "preset" motor 177 operates switch 176 to a position corresponding to the new frequency. Thereafter the band switch motor 79 operates to a position determined by the arm 180 of the "preset" selector switch and by that one of the preset band selectors A, B, C which happens to be in circuit with the particular contact selected by contact arm 180 of the "preset" selector switch. At the same time that the band switch motor is operating, the tuning motor operates the tuning mechanism to drive the unicontrolled condensers 82 to tune the receiver to the desired frequency. Of course, if the new frequency is in the band for which the band switch is already positioned the band switch motor does not operate.

The operation of relay 137 to energize the tuning motor at the beginning of each preset tuning operation, before any operation of the "preset" selector switch 176, has the important advantage that it compels the tuning mechanism to complete any tuning operation for which it is previously set before it can start a second, or new, tuning operation. In this way it avoids, or prevents, operation to false tuning positions. For example, let us suppose that the preset frequency dial 15 be set to frequency No. 3 and the tuning mechanism starts to tune the receiver to that frequency but before this tuning operation is completed the preset frequency dial is moved to frequency No. 10. If the "preset" motor switch 176 operated immediately in response to movement of the preset frequency dial, then such moving of the dial to frequency No. 10 would bring about the immediate deenergization of magnet 95 corresponding to frequency No. 3. This, however, would not necessarily disengage the gears of the group corresponding to frequency No. 3 from gear 87. This is because the direction of rotation of gears 87 and 99 and the following gear is such as to maintain engagement of gear 99. Some reversal of the motor, or at least of gear 87, is required for positive disengagement of these gears. Thus the gears corresponding to frequency No. 3 would continue to operate even after a new magnet corresponding to frequency No. 10 is energized. This energizing of a second magnet may cause two groups of gears to be driven simultaneously by the tuning motor. The result would be that the gears would finally jam with the tuning condenser shaft at a false position not corresponding to either preset frequency No. 3 or No. 10. In accord with my invention this result is prevented by maintaining the "preset" switch 176 in the position corresponding to the last frequency to which dial 15 was set, i. e., preset frequency No. 3, until the tuning mechanism has completed its operation to tune the receiver to that frequency. Thereafter the tuning motor relay becomes energized to deenergize the tuning motor and to energize the "preset" motor 177, which then operates switch 176 to the position corresponding to the new frequency. Thereafter quency relay 178 drops out deenergizing the tuning motor relay and causing the tuning mechanism to operate to the new frequency.

The reversal of gear 87 to disengage any gears in engagement therewith after a tuning operation, is brought about by action of spring 132, one end 100 of which is anchored in a hub 101' fixed on shaft 101 and the opposite end of which is anchored in gear 81 which is free to rotate on shaft 101. Thus the tuning mechanism is driven through this spring which is under a certain tension during the tuning operation.

When the gears jam, shaft 101 and hub 101' stop. Since the motor is still energized, gear 81 is still driven and further tensions the spring until the motor stalls and its rotor stops. Torque, however, still exists in the motor and since the rotor cannot rotate, its stator rotates clockwise as shown in the drawing, closing contacts 134, 135 and 136. Tuning motor relay 137 then deenergizes the forward winding of the motor and spring 132 tends to rotate the rotor in the opposite direction. Since the rotor has inertia, some of the energy of the spring rotates shaft 101, and hence gear 87, backwards thereby freeing any gears in mesh with it. This latter action is aided and rendered more positive by momentary energization of the reverse winding 185' on the motor. This is effected by contact 136, which is engaged by contact 135, which in turn engages contact 134 connected to the +A bus.

To avoid damage to gear 80, 81, 90, 91 and 86 due to inertia of the motor when the gears jam on reaching a preset frequency setting, gear 80 is connected to the shaft of the motor through the friction connection shown, comprising washers engaging each side of it and pressed against it by spring washer 80'.

Automatic tuning to the preset frequencies indicated on dial 15 is had when arms 10 and 11, operated by the control dial 7, are on any one of their three contacts 1, 2 and 3 corresponding to voice reception, telegraphic reception, and bearing reception, as noted on the dial 7. This is true since arm 10 maintains the coil 174 of preset-manual relay energized and arm 11 applies voltage to the contact arms of the preset frequency switch 15.

*Manual tuning*

When the control dial 7 is operated to any of its other positions, namely 4 to 12, manual tuning by means of the hand crank 120 may be had. Arm 10 then connects to ground conductor 304. This conductor extends through cable 37, certain contacts of I. F. relay 39, cable 40 and through relay coil 175 of the preset-manual relay to the +A conductor 55. Relay 173 is thus operated to the right breaking momentarily the holding circuit for relay 137 causing the tuning motor 85 to be energized and to operate. Since none of the "preset" tuning magnets 95, 96 etc. are now energized the gears in the groups corresponding thereto are not operated by the tuning motor and do not jam.

Arm 11 of the control dial 7 breaks the voltage supply circuit to the preset frequency switch 15 and thus relay 178 is deenergized and remains in its deenergized condition. Arm 207 of the preset-manual relay connects to ground conductor 305 thereby completing a circuit through the manual tuning magnet 102, the left-hand armature of the tuning motor relay 137 in its left-hand position, armatures 204 and 205 of the preset-manual relay in their right-hand position and armature 224 of the "preset" motor relay to the +A conductor. Thus manual tuning magnet 102 operates its arm 103 causing the gear 104 to engage gear 87 as previously described. Clutch magnet 105 is now energized through a circuit which extends from ground through the operating coil of this magnet, right-hand armature of relay 137 in its left-hand position, and arm 206 of preset-manual relay 173 to the +A bus. Thus the tuning motor now operates until gears within the clutch housing 109 jam, as previously described. The position of the tuning shaft 83 at which these gears jam is dependent, as previously described, upon the position in rotation of the clutch housing 109, which is controlled by the worm 113, the latter being operated through bevel gears 114 or 115 and flexible mechanical drive connection 117 or 118 from the handcranks 119 or 120. When the gears in housing 109 jam, the tuning motor relay 137 becomes energized, as before, and by its right-hand armature interrupts the energizing circuit of the clutch magnet 105 thereby locking shaft 92 and the tuning condenser shaft 83 in position corresponding to the calibration of handcranks 119 and 120.

Thus the first operation of the tuning control system in response to operation of the control dial 7 to any of its manual tuning positions is to operate the tuning condenser to a position determined by the handcranks. This means that the frequency calibration of the handcranks then agrees with the tuning indicating mechanism (not shown) driven by gear 172 and located on the receiver. The pilot may now operate his handcrank 120 to tune the receiver to any frequency which he desires to select by operating his handcrank to a corresponding position on the scale cooperating therewith and which may be calibrated in terms of frequency.

Since the preset-manual relay armature 173 is in its right-hand position, the circuit of contact arm 180 of the "preset" selector switch is broken at the left-hand contacts of the armatures 204 and 205 of the preset-manual relay. This means that no circuit for the band switch motor 79 can be completed through the "preset" band selectors, A. B. C and the contact arm 180 and that the band in which the receiver operates is determined by the position of contact arm 11 on the control dial 7 which may engage any one of its contacts 4 to 12 thereby completing a circuit for the band switch motor. This circuit extends from conductor 208 in the pilot's control box which, it will be remembered is at +A potential, through arm 11 on the control switch in engagement with any one of its contacts 4 to 9, 11 or 12 and thence through the respective one of conductors 263, 264 or 265 as the case may be, which conductors extend through cable 37, junction box 33, cable 40 to respective brushes 227, 248 and 249 of the commutator 183, brush 226, band switch motor 79 and armature 225 of the "preset" motor relay 178. Thus the band switch motor 79 operates until it rotates nonconducting segment 233 under that one of the brushes 227, 248 and 249, which is in circuit with the arm 11 of the control knob. None of the conductors 263, 264, or 265 can be energized through switch 7 of box 4 since its conductor 208 is open at relay 39.

As previously stated, any interruption of the circuit which deenergizes the tuning motor relay 137 causes the tuning motor 85 to operate to a position where a gear group jams. This is important for the further reason that it means that the first operation of the system which occurs after operating the control dial 7 to a manual tuning position is to adjust the tuning condenser automatically to a position corresponding to the position of the hand crank 120. Thus the pilot knows by looking at the calibration which may be provided to cooperate with the hand crank 120, the frequency to which the receiver is tuned to respond. He may then tune the receiver to any desired frequency in the frequency band selected on dial 7 by simple operation of the hand crank to a calibration corresponding to the desired frequency.

This is also important since it means that when control of the receiver is seized by the operator at the other control box, the first operation of the tuning motor system is to tune the receiver to the condition which is set up in that control box. Thus, for example, let us suppose that the operator at the operator's station seizes control of the receiver by pressing his pushbutton switch 32 and that his control dial 7 is in a "preset" position and that his preset frequency dial 15 is on a position corresponding to frequency No. 3. Operation of his pushbutton 32 operates relay 39 at the junction box which in operating interrupts momentarily the holding circuit of the tuning motor relay. The tuning mechanism then operates immediately to tune the receiver to the preset frequency it was last set at, i. e. to complete any previously uncompleted tuning operation. Thereafter the "preset" switch 176 is positioned to the new frequency and then the tuning mechanism operates the tuning condenser to a position corresponding to frequency No. 3. If, on the other hand, the operator's control dial 7 is in a manual tuning position when he operates pushbutton 32, then the tuning motor operates to tune the receiver immediately to a frequency corresponding to the position of his handcrank 119 in a frequency band determined by the position of his control dial 7.

This operation of relay 137 is also important in bringing about correct operation of the tuning mechanism after the receiver has been deenergized. Of course, dials 7 and 15 may be rotated to any position while the receiver is off. Deenergizing of the receiver itself deenergizes relay 137 and positions it to energize the tuning motor immediately upon energization of the receiver. It then operates to complete the tuning operation for which the system was last previously set and during which the motor may have been stopped before completing the tuning operation. The "preset" selector switch then operates to any new preset frequency position for which the control box may be set when the receiver is turned on. The tuning motor then operates to tune the receiver to the new frequency. If when the receiver is turned "on" the control dial is in a manual tuning position, due to having been changed when the receiver was "off," the motors immediately tune the receiver to the frequency and band corresponding to the position of the handcrank and control dial 7, respectively.

It will now be seen that arms 11 and 10 of the pilot's control dial 7 determine respectively the band in which the receiver is to operate and whether the tuning is manual, as by handcrank 120, or by automatic tuning to frequencies corresponding to the position of preset frequency dial 15.

The circuit changes effected by arms 12, 13 and 14 of the control dial 7 may better be explained after consideration is given to the audio circuits, volume control circuits, and beat frequency oscillator circuits of the receiver.

Audio circuits

The low impedance audio output circuit of the cathode follower amplifier stage coupled to the output of detector 75 extends from that amplifier over conductor 254 of cable 40. This conductor 254 divides at the junction box and one branch 254' extends through cable 35 to the operator's control box 4 and the other branch 254'' extends through cable 37 to the pilot's control box 6 where it is connected to one terminal of the volume control potentiometer 24, the opposite terminal of which is either grounded through arm 12 of the pilot's control switch 7 in certain positions thereof, or is connected to ground through resistance 200 when arm 12 is in other of its positions. A variable contact 22 of this volume control potentiometer 24 is connected through a conductor 255 in cable 37, which conductor extends through the junction box and through cable 40 to the input of the first amplifier 266 in the pilot's A. F. amplifier 77. The output from this amplifier is supplied through conductor 267 in cable 40 which conductor extends through the junction box and cable 37 to the pilot's jack 31 into which he may plug headphones for reception of signals.

A similar circuit for the operator's control box 4 extends from the cathode follower amplifier output through conductor 254 and 254', the latter of which extends through cable 35 to the operator's control box 4 where it is connected in exactly the same way that conductor 254'' is connected in the pilot's control box 6. The variable contact in the operator's control box corresponding to contact 22 of the pilot's control box is connected through conductor 255' in cables 35 and 40 to the input of the first audio frequency amplifier 268 of the operator's A. F. amplifier 76. The output from this amplifier extends over a conductor 269 in cables 40 and 35 to the operator's jack 31. Thus two separate audio frequency channels are provided each of which includes an amplifier 76 or 77 in the receiver and a volume control on control box 4 or 6 which may be manipulated by the operator and pilot, respectively at his respective control box. It is desirable that the detector 75 have an output coupling stage of the cathode follower type since the output is of low impedance, thereby reducing the attenuation produced by the relatively high capacity of the cables connected thereto and makes possible the control of volume at the control boxes by potentiometers 24.

On the same shaft with the volume control contact 22 is a separate rotatable contact 23, which rotates over a resistance 25 to vary the volume by varying the radio frequency amplification of the receiver. This resistance is arranged to be connected between ground and the cathode of the radio frequency amplifier 273 of the receiver as a cathode bias resistor variable to control the gain of the receiver during reception of certain types. With the control dial 7 in the position shown this connection extends through conductor 275 in cable 37 through relay 39 and cable 40 to the upper contact 276 of the selector switch which is engaged by arm 235 when the band switch 78 is operated in the corresponding band. With this arm 235 in the position shown the circuit extends from this contact 235 through choke coil 277 to the cathode of radio frequency amplifier 273. The cathode of this amplifier is connected between resistors 270 and 272 which form a resistance path between the +B bus 199 and ground. Resistance 272 limits the potential on the cathode and hence on the circuit to resistance 25 in the control box when the circuit is momentarily opened as during operation of relay 39 in the junction box.

The volume may also be controlled by movement of contact 23 when the band switch is adjusted for either of the other two bands if the control dial 7 is in any of its positions 2 to 9 where arm 14, operated thereby, engages contacts of its respective bank which are connected to conductor 275. This arm 14 is connected through conductor 278 through cable 37, relay 39, and cable 40 to contacts 274 and 280 of the selector switch and thence through arm 235 of that switch to the cathode of the amplifier. However, if arm 235 of this switch is in engagement with contacts 274 or 280 and arm 14 of the pilot's control dial is in any of its positions 11, 12 or 1, then the cathode of amplifier 273 is directly grounded and volume control contact 23 has no effect.

As soon as operation of the tuning motor and band switch motor is completed, signals are received by both the operator and the pilot in their headphones plugged in their respective jacks 31 and the volume may be controlled by either by operation of the volume control knob 19. However, if control dial 7 of the box that has control is in any of its positions 2 to 9 then volume control knob 19 of that box controls the sensitivity of the receiver while volume control 19 of the other box has no effect on sensitivity but still controls the input to its corresponding audio amplifier.

Automatic silencing

The two audio frequency amplifiers 76 and 77 are inoperative during operation of any of the motors 85, 177 and 79 and thus objectionable noise in the headphones during the tuning operation is prevented. The cathodes of the amplifiers 266 and 268 are connected together and through a conductor 279 to the common terminal of three resistances 282, 283 and 284 shown at the left side of Fig. 1. The opposite terminal of resistance 282 is connected to the high voltage terminal of motor 79. The opposite terminal of resistance 283 is connected to the high voltage terminal of "preset" motor relay 178 and the opposite terminal of resistance 284 is connected to the high voltage terminal of the forward winding 185 of the tuning motor 85. Thus when relay 178 becomes energized sufficient voltage is applied to the cathodes of amplifiers 266 and 268 to silence the receiver so that objectionable noises during operation of the tuning motor 85 are not heard in the headphones. The receiver is maintained silent thereafter during any subsequent operation of the tuning motor 85, the "preset" motor 177 or the band switch motor 79 by the respective connections through resistances 284, 283 and 282 to the cathodes of these amplifiers.

During operation of the receiver, after the motors have completed their operation, the bias voltage between the cathodes of amplifiers 266 and 268 and ground is determined by the net resistance of these circuits including conductor 279 and resistors 282, 283 and 284 through the respective motor or relay windings to ground, since there is then no voltage supplied to the motors or relay 178.

Code reception

During modulated communication, or voice reception, the beat oscillator 184 is inoperative. This oscillator 184 has its control electrode connected through an oscillatory circuit 297, 309 and resistance 298 to ground, this resistance being bypassed for currents of the frequency at which the oscillator operates. Resistance 298 is a part of a bleeder circuit comprising resistances 299 and 302 between the +B bus 199 and ground and its upper terminal is at high positive potential. The cathode of device 184 is connected to an intermediate point on the inductance 297 and is thus at the same high positive potential. This renders the device inoperative since the control electrode is connected to ground through resistance 203 thereby obtaining bias voltage in excess of that required to cut-off its plate current.

During code reception, C. W. communication, the upper terminal of resistance 298 is grounded through conductor 296, which extends through cable 40, certain contacts on I. F. relay 39 and cable 37 to contacts 2 and 7 to 9 of the banks engaged by arm 13 of the pilot's control dial 7. This lowers the cathode potential of device 184 allowing it to oscillate and supply oscillations through condenser 186 to the detector. These oscillations differ in frequency from the intermediate frequency of the receiver by an audible amount such as a thousand cycles per second, which beat frequency is heard in the headphones during continuous wave telegraphic reception.

Automatic volume control

The automatic volume control diode 187 has its anode connected through condenser 292 to the detector input from which it receives the intermediate frequency oscillations of the receiver. This anode is also connected through a load resistance 293 to ground and through an audio filter 294, 295 to the control electrodes of amplifiers in the R. F. and I. F. portions of the receiver. The cathode is connected through a resistance 288 bypassed by condenser 289 to ground, and through resistance 312 to the +B bus 199. Resistances 312 and 288 act as a bleeder to maintain the cathode at sufficiently high potential to make it inoperative except during reception at overloading levels. During reception of overloading signals the intermediate frequency oscillations are rectified to produce a unidirectional potential across resistance 293 to reduce the amplification of the amplifiers to which it is connected. This is a condition which exists during all positions of control dial 7 except positions 1, 11 and 12. In those positions arm 13 of the control dial grounds conductor 285, which conductor extends through cable 37, certain contacts of the I. F. relay 39, cable 40, arm 234 of selector switch when in engagement with either of its two lower contacts and conductor 287 to the intermediate point on resistance 288, thereby grounding this intermediate point. This lowers the potential on the cathode. The diode 187 then functions as an ordinary delayed automatic volume control rectifier to produce across resistance 293 a potential varying with the intensity of the received signals and operating to maintain the intensity constant.

Modulated bearing

It will be seen from the markings on the operator's control dial 7 that the sector bearing the legend "Preset" has three other legends "Bear." "C. W." and "Mod." These legends correspond to positions 3, 2 and 1 as indicated in the pilot's control box and refer to bearing reception, continuous wave telegraphic reception, and modulated or voice reception. During bearing reception it may be desired to utilize the loop antenna 21 which may be arranged on the craft and rotated for determination of bearing from which the received waves arrive. For this purpose relay 313 is employed and arranged in its deenergized position to connect antenna 20 to the receiver and when energized to connect the loop to the receiver. The operating coil of relay 313 may be energized through a circuit including conductor 314 which extends through cables 40 and 37, and loop switch 315 to conductor 192 on which +A voltage exists when the pilot's control box has control of the receiver.

With preset tuning, bearing reception may be had in any band since the band is then determined by the setting of band selectors A, B, C, etc. Also in manual tuning bearing reception may be had in any band by adjustment of the control dial 7 to positions 4, 5 and 6 according to the band desired. It is desired, however, during bearing reception to disable the A. V. C. system especially in band 1, 0.19 to 0.45 megacycle. With the control dial set to positions 4, 5 and 6 this is automatically effected as previously described, i. e. in these positions conductor 285 is not grounded by arm 13 and hence the A. V. C. diode is ineffective except on extremely strong signals.

In the sector of the control dial marked A. V. C., where automatic volume control is had, the .19 to .45 megacycle band, which appears in the other sectors, is omitted. This is to prevent, or avoid, any possibility of obtaining bearing reception with A. V. C. in this band.

With the control dial 7 set to "preset" where the band is determined by the preset band selectors A, B, C, etc. it is likewise desirable to prevent bearing reception in the .19 to .45 megacycle band with A. V. C., even though the preset sector of control dial 7 offers a choice of reception with or without A. V. C. This prevention is provided by arm 234 of the selector switch, which in the position shown, corresponding to this band, breaks the circuit of conductor 285 thereby rendering the A. V. C. circuit inoperative. Arm 235 of selector switch in this position connects in circuit the manual volume control 25 irrespective of the position of the control dial 7. This is necessary during such bearing reception without A. V. C. to enable the operator to reduce the sensitivity of the R. F. portion of the receiver sufficiently to prevent overloading of the receiver.

*Manual volume control*

As previously mentioned the volume of signal received may be manually varied by the two unicontrolled potentiometers 24 and 25 the first of which is connected as previously described in the audio output circuit and the other of which varies the sensitivity of the R. F. portion of the receiver. This other potentiometer, however, is effective only when the control dial 7 is adjusted to C. W., or modulated bearing reception, i e. to positions 2 to 9 inclusive. In these same positions resistance 200 is connected between the low potential terminal of potentiometer 24 and ground to reduce the effectiveness of this latter potentiometer in varying volume. Thus the variation in volume is principally effected in these positions by potentiometer 25. As potentiometer contact 23 is moved to reduce the sensitivity of the R. F. portion of the receiver potentiometer contact 24 is moved in unison with it to reduce the output audio voltage supplied to the pilot's headphones through his own amplifier assuming that the pilot's box has control. This may reduce the signal reproduced in the operator's headphones to an undesirably low level, especially since the operator's station may be located in the plane at a position where there is greater noise than that at the pilot's position. Since the pilot is using only a portion of the audio voltage available across the volume control circuit, the operator may increase the volume of signal in his headphones by operating his volume control knob to positions for greater volume. This does not alter the sensitivity of the R. F. portion of the receiver since his potentiometer 25 is disconnected from the receiver. Thus he may manipulate his volume control to his own satisfaction without affecting the volume of signal heard by the pilot. The operator may thus hear a signal either greater or weaker, as he desires, than that heard by the pilot except for an extremely weak signal where the pilot may have his volume control at maximum. To reduce the volume in the operator's headphones to its minimum, however, his control dial 7 must be operated to one of positions 1, 10, 11 or 12 in which resistance 200 in the operator's control box is shorted by contact arm 12 of switch 7.

*Band width control*

Relay 84 in the intermediate frequency portion of the receiver is arranged to be energized by closure of switch 9 in the control box. This switch bears the legends broad and sharp, corresponding to the two positions of the switch and indicating the resulting frequency band width. This switch, when closed, grounds conductor 322 which extends through cable 37, contacts on relay 39, conductor 322 in cable 40 and thence through winding of relay 84 to the +A conductor 55. Relay 84 may thus change the band width of the intermediate frequency portion of the receiver through connections, not shown.

*Fine tuning*

Fine tuning knob 27 on the control box rotates an arm 28 over a resistance 29, a variable portion of which is connected between conductor 323 and ground. This conductor extends through cable 37, contacts on relay 39, conductor 323 of cable 40 and resistance 324 to the cathode of discharge device 325 in the receiver. This cathode is connected through resistance 326 to the +B conductor 199 and through resistance 327 to ground. These resistances are proportioned to bias the cathode strongly positive and to render that device substantially non-conductive. By reducing the portion of resistance 29 connected between the cathode and ground this bias can be reduced to render the device conducting to a desired degree. Resistance 327 prevents the voltage on the cathode of device 325 from becoming too high when the circuit of conductor 323 is broken in switching control from one box to the other. This device may be connected as shown in application Serial No. 530,127, filed April 8, 1944, now Patent No. 2,419,869 issued April 29, 1947, by George G. Young for oscillation generators to control the tuning of the local superheterodyne oscillator of the receiver over a narrow range for fine tuning. The application of George G. Young is assigned to the same assignee as my present application.

*Figs. 6 and 7*

Fig. 6 shows an elevation view of the tuning mechanism assembly. In this figure the respective parts bear the same reference numerals as in the other figures and no additional description is required.

Fig. 7 shows the clamping means by which the disks 118 of the different gear groups 88, 89, etc are clamped to the shaft 92 in adjustable angular position to correspond to the station to be selected. The gear 66 and washers between it and disk 68 are all rotatably mounted on sleeves 333. Similarly gear 67 and washers between it and disk 68 of the same group are rotatably mounted on sleeve 334. The sleeves 333 and 334 of all the groups are positioned end to end along the shaft, the sleeves abutting in each group against the opposite sides of disk 68. Between the groups these sleeves abut against washers 335.

At the end of the shaft is provided a clamping device by which these sleeves are all compressed against the disks 68 and washers 335 to maintain these disks in fixed position about the shaft. This clamping device comprises two members 336 and 337. Member 337 abuts against a stationary bearing member 338 and is provided with a surface 339 oblique to the shaft against which fits a correspondingly oblique surface 342 of member 336. Member 336 may be operated transversely of the shaft by tightening a set screw 346 provided therein thereby sliding surface 342 over surface 339 in a direction at right angles to the shaft. This draws the shaft to the left clamping all of the sleeves between a bearing 344 at one end of the shaft and a spring member 345 at the other.

If it be desired to change the frequency selected by any of the gear groups, for example gear group 88, the set screw 346 is loosened. The disc 68 of group 88 may then be rotated to the position corresponding to the new frequency whereupon the set screw 346 may again be tightened.

This adjustment may best be made by opening switch 350 to deenergize the clutch magnet and permit the shaft 92 to be turned by means of the handcrank until the receiver is tuned to the new station. Then set screw 346 may again be tightened and switch 350 closed.

While I have shown a particular embodiment of my invention it will, of course, be understood that I do not wish to be limited thereto since many modifications both in the circuit arrangement and in the instrumentalities employed may be made, and I contemplate by the appended claims to cover any such modifications as fall within the spirit and scope of my invention.

What I claim as new and desire to secure by Letters Patent of the United States is:

1. In combination, a receiver having remotely controlled means therein for controlling its operation, at least two control stations having respective control means therein for controlling said remotely controlled means, a source of operating potential, at least two switches in each of said stations, electrically-operated circuit-connecting means responsive to operation of said switches in either station to connect said remotely controlled means to the control means in the respective station, to disconnect it from the control means in the other station, and to energize said receiver from said source, whereby an operator at either station may by operating said switches in his own station seize control of said receiver irrespective of the condition of said control means in the other station.

2. In combination, a receiver having remotely controlled means therein for controlling its operation, at least two control stations having respective control means therein for controlling said remotely controlled means, electrically-operated circuit-connecting means interposed between said stations and receiver constructed and arranged to connect said remotely controlled means to one and the other of said stations alternatively, and operative means in each station to operate said interposed electrically-operated circuit-connecting means to connect said remotely controlled means to the control means in the respective station, whereby the station in which the said operative means is last operated has control of said receiver.

3. In combination, a receiver having remotely controlled means therein for controlling its operation, at least two control stations having respective control means therein for controlling said remotely controlled means, electrically-operated circuit-connecting means interposed between said stations and receiver constructed and arranged to connect said remotely controlled means to one and the other of said stations alternatively, operative means in each station to operate said interposed electrically-operated circuit-connecting means to connect said remotely controlled means to the control means in the respective station, whereby the station in which the said operative means is last operated has control of said receiver, a source of operating potential, said interposed electrically-operated circuit-connecting means including means to connect said source to said receiver through the station to which it connects said receiver, and switch means in each station to control the energization of said receiver.

4. In combination, a receiver, control means in said receiver to control its operation, a plurality of stations, means in each station to control said control means, at least two switches in each station, a source of operating potential, electrically-operated circuit-connecting means responsive to operation of said switches in either station to connect said receiver and said control means to the respective station for control thereby and to connect said source to said receiver through the respective control station, and separate indicating means in said stations to indicate the station to which said receiver is connected and to indicate the energization of said receiver.

5. In combination, a plurality of receivers, a plurality of control stations associated with each receiver, a source of operating potential, a plurality of relays each corresponding with one of said receivers and each constructed and arranged to connect its respective receiver to one and another of the control stations associated therewith alternatively and to connect the respective receiver to said source through the station to which the respective receiver is connected, and means in each control station to operate the respective relay to connect said receiver to the corresponding control station and to control the connection of said receiver to said source.

6. In combination, a plurality of receivers, a plurality of control stations associated with each receiver, a source of cathode energizing potential, an anode voltage generator, a motor to drive said generator, a plurality of relays each corresponding to one of said receivers and each constructed and arranged to connect its respective receiver to one and another of its associated control stations alternatively and to connect the respective receiver to said source of cathode energizing potential through the station to which the respective receiver is connected, an additional relay for each receiver arranged when operated to connect said motor to said source, and means in each control station to operate the respective one of said first mentioned relays to connect said receiver to the corresponding control station, to connect said receiver to said source, and to operate one of said additional relays to energize said motor to drive said anode voltage generator and connections from said generator to all of said receivers to supply anode operating voltage thereto.

7. The combination, of a remotely controlled receiver, a plurality of stations to control said receiver, each of said stations having therein a control device to control said receiver when connected thereto, a relay, means to operate said relay, said relay being arranged in one position to connect said receiver to the control device in one station and in the other position to connect said receiver to the control device in the other station and in either position to connect said receiver to said source through the respective station to which said receiver is connected, means in each station to interrupt the connection of said receiver to said source, and means in each station to indicate the position of said relay and to indicate, irrespective of the position of said relay, whether or not said receiver is connected to said source.

8. In combination, a receiver having automatic volume control means and automatic frequency selecting means, a remote station to control said frequency selecting means to select any one of a plurality of frequencies, certain of said frequencies lying in different frequency bands, said frequency selecting means including means to select said bands, means in said remote station operative to positions corresponding to the type of reception desired, and means controlled both by said last means at said remote station and said band selecting means at said receiver to disable said automatic volume control means when reception is had in a particular band and to render said automatic volume control means effective in another band.

9. In combination, a receiver having automatic volume control means and automatic station selecting means, a remote station to control said station selecting means to select any one of a plurality of stations, certain of said stations lying in different frequency bands, said station selecting means including means to select said bands, means in said remote station operative to positions corresponding to the type of reception desired, means controlled both by said last means at said remote station and said band selecting means at said receiver to disable said automatic volume control means when reception is had in a particular band and to render said automatic volume control means effective in the other bands, and means at said remote station operable to reduce the sensitivity of said receiver during reception of said one type in said particular band where said automatic volume control means is disabled.

10. In combination, a radio receiver, two remote stations, separate audio channels extending from said receiver to each of said stations, means in each station to vary transmission in the repective channel, means in each station to vary the sensitivity of said receiver, means to render said sensitivity varying means in each station alternatively effective, and means to reduce the effectiveness of the transmission varying means in either station when the sensitivity varying of the same station is effective.

11. In combination, a radio receiver, a remote station, an audio channel extending from said receiver to said station, means at said station to vary transmission through said channel, means uncontrolled therewith at said station to vary the sensitivity of said receiver, means at said station to render said last means alternatively operative and inoperative and to reduce the effectiveness of said first means when said second means is operative.

12. In combination, a radio receiver, two remote stations, each including means to control the operation of said receiver, means to connect said receiver to said control means in said two stations alternatively, separate permanent audio channels extending from said receiver to said stations, each station including means to vary transmission through its respective channel, and said control means in each station including means to vary the sensitivity of said receiver through said connecting means, said transmission varying means and sensitivity varying means in each station being uncontrolled and operative to vary the output from said receiver in like sense, and means in each station to render said sensitivity varying means alternatively effective and ineffective and when effective to reduce the effectiveness of said transmission varying means to reduce volume of output, whereby the output volume in the station, the control means of which is connected to said receiver, is varied principally by said sensitivity control means but the output in the other station may be increased therein by operation of said transmission control without affecting the sensitivity of said receiver.

KIRBY B. AUSTIN.

REFERENCES CITED

The following references are of record in the file of this patent:

UNITED STATES PATENTS

| Number | Name | Date |
|---|---|---|
| 1,766,505 | Marvel | June 24, 1930 |
| 1,795,269 | Washington | Mar. 3, 1931 |
| 1,927,260 | Erbe | Sept. 19, 1933 |
| 1,979,588 | Vreeland | Nov. 6, 1934 |
| 2,021,705 | Thomas | Nov. 19, 1935 |
| 2,035,612 | Liebreich | Mar. 31, 1936 |
| 2,093,847 | Pruden | Sept. 21, 1937 |
| 2,099,719 | Banning, Jr. | Nov. 23, 1937 |
| 2,117,638 | Walter | May 17, 1938 |
| 2,190,546 | Laube | Feb. 13, 1940 |
| 2,211,894 | Heisner | Aug. 20, 1940 |
| 2,241,157 | Powell | May 6, 1941 |
| 2,311,168 | Gendriess | Feb. 16, 1943 |

Certificate of Correction

Patent No. 2,495,916 January 31, 1950

KIRBY B. AUSTIN

It is hereby certified that errors appear in the printed specification of the above numbered patent requiring correction as follows:

Column 10, line 28, after "right-hand" insert *contact*; column 12, line 15, for the word "equivalent" read *equipment*;

and that the said Letters Patent should be read with these corrections therein that the same may conform to the record of the case in the Patent Office.

Signed and sealed this 27th day of June, A. D. 1950.

[SEAL]

THOMAS F. MURPHY,
*Assistant Commissioner of Patents.*